3,420,841
1,3-DI-(4-PYRIDYL)PROPANE DERIVATIVES
Bernard Brust, Parsippany, Troy Hills, Rodney Ian Fryer, North Caldwell, and Leo Henryk Sternbach, Upper Montclair, N.J., assignors to Hoffmann-La Roche Inc., Nutley, N.J., a corporation of New Jersey
No Drawing. Continuation-in-part of application Ser. No. 380,936, July 7, 1964. This application June 21, 1965, Ser. No. 465,753
U.S. Cl. 260—296  6 Claims
Int. Cl. C07d 31/26; C07d 31/32; C07d 31/50

ABSTRACT OF THE DISCLOSURE 1,3-di-(4-pyridyl)propane derivatives substituted in 2-position by alkyl, phenyl, substituted phenyl, benzyl or a 5- or 6-membered heterocyclic group are prepared by hydrogenating the corresponding 1,3-di-(4-pyridyl)-2-propenyl derivatives. The products are pharmacologically useful as anti-convulsant agents.

---

This application is a continuation-in-part of application Ser. No. 380,936, filed July 7, 1964, now abandoned.

This invention relates, in general to novel compounds and to processes for producing same. More particularly, the invention relates to pharmacologically active pyridyl compounds and to processes for the manufacture thereof.

The compounds of the invention, broadly, are selected from the group consisting of members having the formula

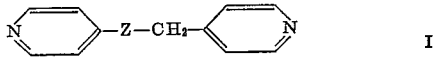
I in which the symbol Z is a member selected from the group consisting of

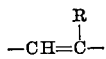

and

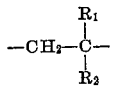

said R being a member selected from the group consisting of an alkyl group having from 1 to 12 carbon atoms, an alkenyl group having from 2 to 12 carbon atoms, an alkynyl group having from 2 to 12 carbon atoms, a cycloalkyl group having from 3 to 8 carbon atoms, an aryl radical, an aralkyl radical, a 5-member heterocyclic radical and a 6-member heterocyclic radical; said $R_1$ being a member selected from the group consisting of an alkyl group having from 1 to 12 carbon atoms, a cycloalkyl group having from 3 to 8 carbon atoms, an aryl radical, an aralkyl radical, a 5-member heterocyclic radical and a 6-member heterocyclic radical; said $R_2$ being a member selected from the group consisting of hydrogen, amino and substituted amino and salts thereof with medicinally acceptable acids.

The terms "alkyl," "alkenyl" and "alkynyl," which appear in the immediately preceding paragraph and which, in various instances, will appear in paragraphs following hereinafter, include straight chain as well as branch chain radicals. Moreover the terms "aryl," "aralkyl" and 5- and 6-member heterocyclic radicals which appear in the preceding paragraph, as well as in later paragraphs, include substituted as well as unsubstituted aryl, aralkyl and heterocyclic radicals. The expression "medicinally acceptable acids" which will be used throughout the specification and in the claims embraces inorganic acids, such as, hydrochloric acid, sulfuric acid, nitric acid, etc., as well as organic acids, such as, p-toluene sulfonic acid.

Thus, the present invention encompasses compounds having the formula

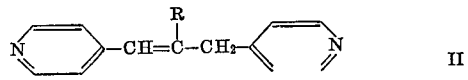
II in which the symbol R has the same meaning as in Formula I and salts thereof with medicinally acceptable acids. Additionally, the invention embraces compounds having the formula

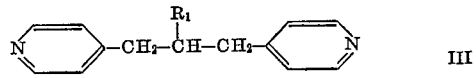
III in which the symbol $R_1$ has the same meaning as in Formula I and salts thereof with medicinally acceptable acids. Furthermore, the invention embraces compounds having the formula

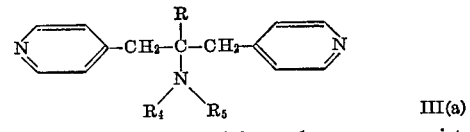
III(a)

in which $R_4$ is a member selected from the group consisting of hydrogen, alkyl having from 1 to 6 carbon atoms and the radical

in which X is a member selected from the group consisting of hydrogen and alkyl having from 1 to 5 carbon atoms; in which $R_5$ is a member selected from the group consisting of hydrogen and alkyl having from 1 to 6 carbon atoms; and in which R has the same meaning as in Formula I and salts thereof with medicinally acceptable acids.

A preferred group of compounds falling within the scope of Formulas I and II are those having the formula

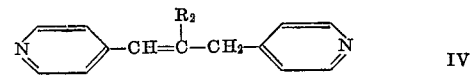
IV in which $R_2$ is a member selected from the group consisting of an alkyl group having from 1 to 12 carbon atoms, an alkenyl group having from 2 to 12 carbon atoms, an alkynyl group having from 2 to 12 carbon atoms, a phenyl radical, a halogen-substituted phenyl radical, a lower alkyl-substituted phenyl radical, a lower alkoxy-substituted phenyl radical, a lower alkylmercapto-substituted phenyl radical and a benzyl radical and salts thereof with medicinally acceptable acids.

A preferred group of compounds falling within the scope of Formulas I and III are those having the formula

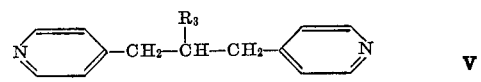
V in which $R_3$ is a member selected from the group consisting of an alkyl group having from 1 to 12 carbon atoms, a phenyl radical, a halogen-substituted phenyl radical, a lower alkyl-substituted phenyl radical, a lower alkoxy-substituted phenyl radical, a lower alkyl-mercapto-substituted phenyl radical and a benzyl radical and salts thereof with medicinally acceptable acids.

As used in the immediately preceding paragraphs, the expression "lower alkyl" denotes, in each instance, an alkyl group having from 1 to 6 carbon atoms. Similarly, the expression "lower alkoxy" which is found in the preceding paragraphs denotes an alkoxy radical, the alkyl residue of which contains from 1 to 6 carbon atoms.

The alkyl groups, which in the foregoing formulas, are represented by the symbols R, $R_1$, $R_2$ and $R_3$, include, for example, methyl, ethyl, propyl, butyl, isopropyl, pentyl, hexyl, heptyl, etc. radicals. The alkenyl groups which, in Formulas I, II and IV, are represented by the symbols R and $R_2$, include, for example, ethylene, propylene, butylene, etc. radicals. The alkynyl groups which, in the foregoing Formulas I, II and IV, are represented by the symbols R and $R_2$ include, for example, ethynyl, propynyl, butynyl, etc., radicals. Cyclopropyl, cyclobutyl, cyclopentyl, cyclohexyl, cycloheptyl and cyclooctyl radicals are examples of the cycloalkyl groups which, in Formulas I, II and III are represented by the symbols R and $R_1$. Specific examples of the aryl radicals which are represented in Formulas I to III, inclusive, by the symbols R and $R_1$ are the phenyl radicals; lower alkyl-substituted phenyl radicals, such as, methyl phenyl, ethyl phenyl, propyl phenyl, butyl phenyl etc. radicals; halogen-substituted phenyl radicals, such as, fluorophenyl, bromophenyl, etc.; lower alkoxy-substituted phenyl radicals, such as, methoxyphenyl, ethoxyphenyl, etc. radicals; and lower alkylmercaptophenyl radicals, such as, methylmercaptophenyl, ethylmercaptophenyl, etc., radicals. Benzyl is an example of an aralkyl radical which, in Formulas I to III, inclusive, is represented by the symbols R and $R_1$. Specific examples of the 5- and 6-member heterocyclic radicals which, in Formulas I to III, inclusive, are represented by the symbols R and $R_1$ are pyridyl, furyl, thienyl, pyrrolyl, etc., radicals as well as lower alkyl-substituted, e.g. methyl, ethyl, propyl, butyl, etc., derivatives thereof. The $R_5$, $R_4$ and X alkyl groups include, e.g. methyl, ethyl, propyl, isopropyl, butyl, pentyl, etc. radicals. $R_5$ and $R_4$ represent, also, a hexyl radical.

The compounds of Formula I, and the acid addition salts thereof, relieve or diminish tremors which are brought about in animals by Tremorine, i.e., 1,4-di-pyrrolidino-2-butyne with a minimum of peripheral anticholinergic side effects. Additionally, they reduce hypothermia produced by Tremorine. Thus, the compounds are indicated for use in the study of the treatment of tremors which are characteristic of Parkinson's Disease. Furthermore, the compounds of this invention alter the activity of the liver microsomal drug metabolizing enzyme. For example, they inhibit the following enzymatic oxidative reactions: hexobarbital to ketohexobarbital, acetanilid to p-hydroxyacetanilid, amphetamine to phenylacetone, dilantin to its p-hydroxy derivatives, etc. On prolonged administration the compounds of this invention stimulate the activity of the liver microsomal drug metabolizing enzymes. Because of their activity, these compounds provide a valuable tool for the study of the drug metabolizing enzyme systems associated with the liver microsomes and are useful in the study and treatment of diseases caused by metabolic failures of such enzyme systems, for example, in the treatment of phenylketonuria.

Furthermore, the compounds of this invention have unexpected anticonvulsant activity and, hence, are used as anticonvulsant agents.

The compounds of this invention are readily produced. The compounds of Formula II are obtained by the dehydration of an alcohol having the formula

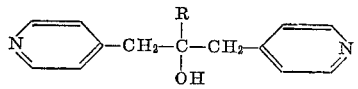

VI in which the symbol R has the same meaning as in Formula I. In a more limited embodiment, the compounds of Formula IV are obtained by the dehydration of a compound of Formula VI in which the symbol R has the same meaning as the symbol $R_2$ in Formula IV. The compound produced by such dehydration reaction can be converted, if desired, into a salt with a medicinally acceptable acid. The compounds of Formulas III and V are obtained by the catalytic hydrogenation of the compounds of Formulas II and IV, respectively.

In general, the dehydration of the Formula VI compound can be carried out by any method known per se.

In a preferred embodiment of the invention, dehydration of the Formula VI compound is effected by heating same, preferably at a temperature within the range of from about 60° C. to about 100° C., in the presence of a concentrated mineral acid, e.g., sulfuric acid, hydrochloric acid, nitric acid, etc. The use of sulfuric acid as the dehydrating agent is particularly preferred. However, if desired, the reaction can be carried out using, as the dehydrating agent, a phosphorus trihalide, such as, phosphorus trichloride, phosphorus tribromide, etc.; acetic anhydride; a mixture of acetic anhydride and zinc chloride; etc. Moreover, the dehydration can be carried out by refluxing the Formula VI compound in a solution of iodine in toluene. Other applicable dehydration processes whereby the Formula II and Formula IV compounds are obtained from the corresponding Formula II compounds, will be immediately apparent to persons skilled in the art.

The compounds of Formula II and Formula IV are readily isolated from the reaction mixture. Various known techniques can be, and are, employed. In a preferred procedure, after the reaction has been completed, the reaction mixture is added to, and stirred in, a mixture of ice and alkali. While any alkali can be used, for example, sodium hydroxide, potassium hydroxide, etc., ammonium hydroxide is preferably employed. The mixture, which is thus obtained, is, thereafter, extracted with a suitable solvent, for example, methylene chloride, diethyl ether, etc. and filtered. The organic phase is then dried, for example, over magnesium sulfate, and evaporated, in vacuo, to dryness.

The reaction product which is obtained by the dehydration and isolation procedures described in the preceding paragraph, is a mixture of isomers. The mixture can be worked up, if desired, by any conventional means to separate the cis isomer and trans isomer. Such separation is effected, most conveniently, by crystallization.

The alcohols of Formula VI, that is, the starting materials which are used in the practice of this invention, have not, as yet, been described in the literature. Those alcohols, and processes for their production, were known to us, however, prior to the present invention. It is to be understood that neither the alcohols of Formula VI, nor processes for their production which will be described hereinafter, are part of the present invention.

The starting alcohols of Formula VI are readily prepared. For the purposes of illustration, alternate processes will be described herein for producing the starting Formula VI alcohols. Such disclosure should not be construed as indicating that the invention is limited to the use of alcohols produced by such methods. Rather, compounds having the structure depicted in Formula VI can be employed herein regardless of their method of preparation. In general, the starting materials of Formula VI are conveniently prepared by reacting a 4-picolyl metal compound having the formula

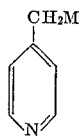

VII in which the symbol M represents an alkali metal, such as, sodium, potassium or lithium either with an acid halide having the formula

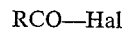

RCO—Hal          VIII in which the symbol R has the same meaning as in Formula VI and in which Hal represents a halogen atom or with an ester having the formula

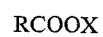

RCOOX          IX in which the symbol R has the same meaning as in Formula VI and in which the symbol X represents an alkyl, phenyl or benzyl radical. More specifically, the alcohols of Formula VI are prepared by reacting a 4-picolyl metal compound of Formula VII with an acid halide of Formula VIII, such as, benzoyl chloride; a halogen-substituted benzoyl chloride, for example, 3-fluorobenzoyl chloride, 4-fluorobenzoyl chloride, 4-chlorobenzoyl chloride, etc.; a lower alkyl-substituted benzoyl chloride, for example, p-toluoyl chloride; a lower alkoxy-substituted benzoyl chloride, for example, methoxybenzoyl chloride; a lower alkylmercapto-substituted benzoyl chloride, for example, methylmercaptobenzoyl chloride; acetyl chloride; isobutynyl chloride; octanoyl chloride; 10-undecenoyl chloride; phenacetyl chloride; a cycloalkyl carboxylic acid halide, for example, cyclopropyl carboxylic acid chloride, cyclobutyl carboxylic acid chloride, cyclopentyl carboxylic acid chloride, cyclohexyl carboxylic acid chloride; cycloheptyl carboxylic acid chloride, cyclooctyl carboxylic acid chloride; a halide of a 5- or 6-member heterocyclic carboxylic acid, for example, a halide of a pyridine carboxylic acid, such as, a chloride of 2-pyridine carboxylic acid, a chloride of 4-pyridine carboxylic acid; a halide of a furoic acid, such as, a chloride of 2-furoic acid; a halide of a thiophene carboxylic acid, such as, a chloride of 2-thiophene carboxylic acid; a halide of a pyrrol carboxylic acid, such as, a chloride of 2-pyrrol carboxylic acid; or a halide of a lower alkyl-substituted derivative of such 5- or 6-member carboxylic acids. Obviously, halides of the named compounds, other than chlorides, can be used.

In the alternate process for producing the starting materials of Formula VI, the 4-picolyl metal compound of Formula VII is reacted with an ester of Formula IX, such as, an alkyl ester of benzoic acid, for example, methyl benzoate, ethyl benzoate, etc.; an alkyl ester of an alkyl-substituted benzoic acid, for example, the methyl ester of toluic acid, the ethyl ester of toluic acid; an alkyl ester of a halogen-substituted benzoic acid, for example, methyl chlorobenzoate, ethyl chlorobenzoate, methyl fluorobenzoate, ethyl fluorobenzoate, etc.; benzylbenzoate; a benzyl ester of an alkyl-substituted benzoic acid, for example, the benzyl ester of toluic acid; a benzyl ester of a halogenate benzoic acid, for example, benzyl chlorobenzoate, benzyl fluorobenzoate; an alkyl ester of a lower alkoxy-substituted benzoic acid, for example, the methyl ester of methoxy-substituted benzoic acid; an alkyl ester of an alkylmercapto-substituted benzoic acid, for example, the methyl ester of methylmercapto benzoic acid; a benzyl ester of an alkoxy-substituted benzoic acid, for example, the benzyl ester of methoxy-substituted benzoic acid; a benzyl ester of a lower alkylmercapto-substituted benzoic acid, for example, the benzyl ester of methylmercapto benzoic acid; an alkyl ester, such as a methyl, ethyl, propyl, butyl, etc. ester, of, for example, acetic acid, isobutynic acid, octanoic acid, 10-undecenoic acid or a benzyl or phenyl ester of such an acid; an alkyl ester of a cycloalkyl carboxylic acid, for example, the methyl, ethyl, butyl, etc. esters of cyclopropyl carboxylic acid, cyclobutyl carboxylic acid, cyclopentyl carboxylic acid, cyclohexyl carboxylic acid or a phenyl or benzyl ester of such cycloalkyl carboxylic acid; an alkyl ester, for example, a methyl, ethyl, propyl, butyl, etc. ester of 5- or 6-member heterocyclic acid, such as, 2-pyridine carboxylic acid, 4-pyridine carboxylic acid, 2-furoic acid, 2-thiophene carboxylic acid, or a phenyl or benzyl ester of such a heterocyclic carboxylic acid.

The reaction of the 4-picolyl metal compound of Formula VII with either the Formula VIII compound or the Formula IX compound to produce the Formula VI starting material is carried out preferably in an inert solvent, for example, benzene, diethyl ether, toluene, 4-picoline, tetrahydrofuran, at a temperature within the range of from about —10° C. to about —60° C. In carrying out such reaction, there is used, preferably, a ratio of at least about 2.0 moles of the 4-picolyl metal compound of Formula VII for each mole of the Formula VIII or IX compound employed. Obviously, however, a larger or smaller quantity of the 4-picolyl metal compound can be used in the reaction if desired. The reaction product of Formula VI, the starting material used herein, can be isolated from the reaction mixture and, if desired, purified by any conventional procedure.

Hydrogenation of the Formula II or IV compounds to obtain, respectively, the novel Formula III or V compound of this invention is readily effected. In general, the conversion is carried out using a sufficient quantity of hydrogen to convert the

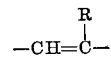

group to the desired

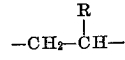

group. In all instances, except those in which R in the group

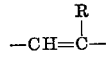

represents an alkenyl or alkynyl radical, only one equivalent of hydrogen is needed to accomplish this. Where, however, R in the

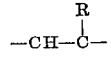

group is an alkenyl or alkynyl radical, two, in the case of an alkenyl radical, and three, in the case of an alkynyl radical, equivalents of hydrogen will be employed to convert such radicals to the corresponding alkyl radical. In any event, the reaction is carried out by such methods, and using such techniques and conditions, as will preclude the hydrogenation of the pyridyl radicals. As the hydrogenation catalyst one can employ Raney nickel, palladium and platinum as well as other known hydrogenation catalysts. While the hydrogenation can be effected at an elevated temperature and/or at an elevated pressure, the reaction is carried out preferably at room temperature and atmospheric pressure.

The compounds of Formula III(a) are similarly readily prepared. In the preparative method, a compound of Formula VI is treated, in a convenient manner, with concentrated sulfuric acid and an alkali metal cyanide, at a temperature of about room temperature, preferably below about room temperature, to yield a compound having the formula

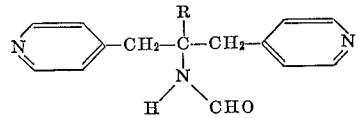    X

The treatment of the compound of Formula X with mineral acid, e.g., hydrochloric acid, preferably at reflux temperature, yields a compound of the formula

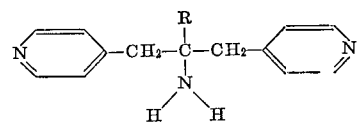    XI

In the alternative, the compound of Formula X can be treated with a base, such as, an alkali metal hydride, and with an alkyl halide, e.g. methyl iodide, to obtain a compound of the formula

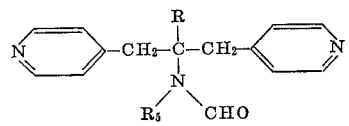    XII

The compound of Formula XII can be treated with mineral acid, e.g. hydrochloric acid, preferably at reflux temperature to yield the compound of the formula

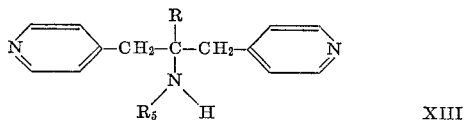

The compound of Formula XIII can be obtained, also, by the catalytic or chemical reduction of the corresponding acylated derivative of the compound of Formula XI. Such acylated compound has the formula

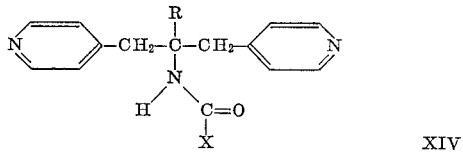

and it can be prepared by the reaction of the Formula XI compound with an appropriate acid halide.

The compound having the formula

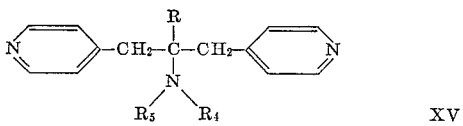

is obtained by the chemical or catalytic reduction of an acylated derivative of the compound of Formula XIII. Such acylated compound has the formula

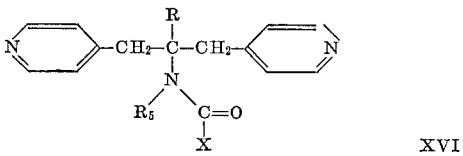

and it can be prepared by reacting the Formula XIII compound with an appropriate acid halide.

In the foregoing Formulas X to XVI, inclusive, the symbol R has the same meaning as in Formula I and the symbols X, $R_4$, and $R_5$ have the same meaning as in Formula III(a).

As indicated heretofore, the compounds of this invention are useful, inter alia, in the study and treatment of diseases caused by metabolic failures of enzyme systems. Additionally, the compounds have anticonvulsant activity and are employed as anticonvulsant agents. The manner in which they are used for such purposes will be readily apparent to persons skilled in the art. In general, the compounds can be formulated, with conventional inert adjuvants, into dosage forms suitable for oral or parenteral administration. Such dosage forms include tablets and capsules as well as solutions and suspensions. The frequency of administration is variable depending upon the needs and requirements of the patient.

In addition to their own pharmacological activity, the compounds of the invention are useful as intermediates for certain therapeutical activity compounds. For example, the terminal 4-pyridyl groups which characterize the present compounds can, by suitable means, be converted into 4-piperidyl groups to yield compounds having valuable and unexpected pharmacological activity.

For a fuller understanding of the nature and objects of this invention, reference may be had to the following examples which are given merely as further illustrations of the invention and are not to be construed in a limiting sense.

EXAMPLE 1

In this example, a solution of 25.0 grams (86 millimoles) of 2-phenyl-1,3-di(4-pyridyl)-2-propanol in 150 ml. of sulfuric acid (60% by volume) was prepared and allowed to stand for a period of about sixteen hours at a temperature of about 75° C. At the end of that period of time, the reaction mixture was added to, and stirred in, an excess of iced ammonium hydroxide, following which the mixture was extracted with 100 ml. of methylene chloride. The aqueous-organic system was filtered and the organic phase was separated. The organic phase was then dried over magnesium sulfate and concentrated, in vacuo. There was, thus obtained, 1,3-di(4-pyridyl)-2-phenyl-1-propene. It was determined by Thin Layer Chromatography over activated silica and elution with ethyl acetate (95%) and methanol that the product, in the form of colorless crystals, was, in fact, a mixture of the cis and trans isomers of 1,3-di(4-pyridyl)-2-phenyl-1-propene. The mixture, recrystallized with hexane, yielded the pure trans 1,3-di(4-pyridyl)-2-phenyl-1-propene in the form of colorless needles melting at 126° to 128° C.

The hexane mother liquors, which were recovered from the recrystallization steps, were combined and concentrated to about 50% of original volume. An additional quantity of the trans isomer, which precipitated from solution during the concentration procedure, was recovered by filtration. The filtrate was then concentrated, in vacuo, to an oil which, subsequently, was recrystallized to give the cis 1,3-di(4-pyridyl)-2-phenyl-1-propene in the form of colorless needles melting at 71° to 73° C.

For the sake of completeness, the preparation of the 2-phenyl-1,3-di(4-pyridyl)-2-propanol starting material is set forth hereinafter although it should be understood that neither the compound itself nor the process for its preparation comprises a part of the instant invention.

An ether-benzene solution of 1.89 liters containing 3.5 moles of phenyl lithium was added, over a 3½ hour period, to a stirring solution of 326 grams of 4-picoline (3.5 moles) in 800 ml. of tetrahydrofuran. This addition was carried out in an atmosphere of dry nitrogen. When the addition of the phenyl lithium solution to the 4-picoline solution was completed, the reaction mixture was stirred for an additional 15 minutes. The reaction mixture was then cooled to a temperature of about −20° C. There was thus produced picolyl lithium.

A mixture of 197 grams of benzoyl chloride (1.4 mole) and 100 ml. of tetrahydrofuran was added to the picolyl lithium solution, produced as described in the preceding paragraph, over a fifty-minute period. During this addition, the temperature of the reaction mixture was maintained at about −20° C. A pale green colored reaction mixture was obtained and it was stirred at a temperature of about −20° C. for a period of about sixty minutes. Thereafter, the reaction mixture was brought to about room temperature, at which temperature the mixture was stirred for a period of about sixty minutes. Subsequently, 100 ml. of water was added to the reaction mixture in a dropwise manner. The reaction mixture was then diluted with 1 liter of water, stirred vigorously and transferred to a separatory funnel. In this vessel, the reaction mixture was acidified using 800 ml. of 6 N hydrochloric acid. The acid layer was separated from the organic phase and the latter was extracted two times, using 200 ml. of 3 N hydrochloric acid each time. The acid extracts were combined, washed first three times using 500 ml. of toluene each time, and, subsequently, one time using 500 ml. of ether. Subsequently, 5 kg. of ice was added to the acid extracts which were then made alkaline using ammonium hydroxide. During this step, the acid extracts were maintained at a temperature of about 10° C.

Treatment of the acid extracts with alkali, as described in the preceding paragraph, resulted in the formation of a precipitate. This precipitate was recovered by filtration, following which it was washed five times using 1.0 liter of water each time. The precipitate was then partitioned between 400 ml. of methylene chloride and 600 ml. of water and the mixture was thoroughly shaken. The insoluble residue was removed by filtration and washed two times using 200 ml. of water each time. Thereafter, the residue was washed two times using 200 ml. of methylene chloride each time and one time using 200 ml. of ether. The product was then dried in a vacuum oven at a temperature of 50° C. (20" Hg) for a period of about 15 hours. There was obtained by this procedure, 2-phenyl-1,3-di(4-pyridyl)-2-propanol melting first at 92° to 99° C., resolidifying and melting again at 166° to 168° C.

EXAMPLE 2

A solution of 10.0 grams (0.0437 mole) of 2-methyl-1,3-di(4-pyridyl)-2-propanol in 50 ml. of sulfuric acid (70%) was prepared and stirred for a period of twenty-two hours at a temperature of about 75° C. The solution, at the end of that period of time, was cooled in an ice-bath, made alkaline with ammonium hydroxide and extracted two times, using 100 ml. of methylene dichloride each time. The organic layers were then combined, washed with 75 ml. of saturated brine, dried over sodium sulfate and concentrated. The residual oil was dissolved in benzene and chromatographed on 70 grams of alumina (neutral grade 1). It was eluted with 200 ml. of benzene, 200 ml. of methylene dichloride and 200 ml. of methanol.

Fractions 1 and 2 were combined and dissolved in 50 ml. of methanol. The solution was, thereafter, saturated with hydrogen chloride, following which 100 ml. of ether was added thereto. The salt which precipitated from solution was recovered by filtration. Recrystallization of the precipitate from a methanol-ether mixture containing a trace of water yielded 2-methyl-1,3-di(4-pyridyl)-1-propene dihydrochloride hydrate in the form of white rods, melting at 181° to 186° C.

For the sake of completeness, the preparation of the 2-methyl-1,3-di(4-pyridyl)-2-propanol starting material is set forth hereinafter although it should be understood that neither the compound itself nor the process for its preparation comprises a part of the instant invention.

A solution of 0.5 mole of 4-picolyl lithium in tetrahydrofuran was first prepared. This solution was brought to a temperature within the range of from about —30° to —50° C. To this cooled solution there was added, under an atmosphere of dry nitrogen, 0.2 mole of acetyl chloride dissolved in 150 ml. of tetrahydrofuran. This addition was effected in a dropwise fashion over a period of about sixty minutes. Thereafter, the reaction mixture was stirred overnight, following which it was diluted with 100 ml. of water. The reaction mixture was then extracted three times using 150 ml. of 6 N hydrochloric acid each time. The acid extracts were then stirred into a mixture of 500 grams of ice and 300 ml. of concentrated ammonium hydroxide with the temperature being maintained at about 0° C.

The clear solution, obtained as described in the preceding paragraph, was thereafter extracted three times, using 150 ml. of methylene chloride each time. The organic extracts were combined, dried over magnesium sulfate and reduced, in vacuo, to an oil. Trituration with hexane yielded 2-methyl-1,3-di(4-pyridyl)-2-propanol as yellow crystals melting at 120° to 125° C. Recrystallization of the product three times from an acetone-hexane mixture yielded the compound, in the form of colorless blocks, melting at 127° to 128° C.

EXAMPLE 3

In this example, a solution of 5.0 grams (16.5 millimoles) of 1,3-di(4-pyridyl)-2-(p-tolyl)-2-propanol in 50 ml. of sulfuric acid (75%) was first prepared. This solution was stirred at a temperature of 75° C. for a period of about eighteen hours. At the end of that period of time the reaction mixture was poured into 250 ml. of concentrated ammonium hydroxide and 500 grams of ice. The mixture was, thereafter, extracted with 150 ml. of ether, following which the ether extracts were dried over magnesium sulfate and concentrated in vacuo. There was, thus obtained, a mixture of the cis and trans isomers of 1,3-di(4-pyridyl)-2-(p-tolyl)-1-propene in the form of an oil. On standing, this oil solidified, melting point at 100° to 118° C. Recrystallization of the solid product from hexane yielded the pure cis 1,3-di(4-pyridyl)-2-(p-tolyl)-1-propene, melting at 116° to 117.5° C.

The trans, 1,3-di(4-pyridyl)-2-(p-tolyl)-1-propene was detected by Thin Layer Chromatography and U.V. spectrum but was not isolated.

The starting 1,3-di(4-pyridyl)-2-(p-tolyl)-2-propanol was prepared by the reaction of p-toluoyl chloride with 4-picolyl lithium, the said process being carried out in the same manner as described in Example 1 for the production of 2-phenyl-1,3-di(4-pyridyl)-2-propanol.

EXAMPLE 4

In this example, a solution of 9.5 grams (30.8 millimoles) of 2-(2-fluorophenyl)-1,3-di(4-pyridyl)-2-propanol in 75 ml. of sulfuric acid (75%) was first prepared. This solution was stirred for a period of four hours at a temperature of about 85° C. Thereafter, the cooled reaction mixture was poured into 400 ml. of concentrated ammonium hydroxide and 1 kg. of ice. The mixture was then extracted with 150 ml. of ether, following which the extracts were concentrated in vacuo. There was, thus obtained, an oily mixture of the cis and trans 2-(2-fluorophenyl)-1,3-di(4-pyridyl)-1-propene. Crystallization from hexane yielded cis 2-(2-fluorophenyl)-1,3-di(4-pyridyl)-1-propene in the form of colorless needles melting at 105° to 107° C. Concentration of the hexane mother liquor yielded the trans 2-(2-fluorophenyl)-1,3-di(4-pyridyl)-1-propene in the form of light yellow prisms melting at 88° to 90° C.

The 2-(2-fluorophenyl)-1,3-di(4-pyridyl)-2-propanol starting material was prepared by reacting 4-picolyl lithium with 2-fluorobenzoyl chloride, the process being carried out in the same manner as described in Example 1 for the production of 2-phenyl-1,3-di(4-pyridyl)-2-propanol.

EXAMPLE 5

In this example, a solution of 5.0 grams (14.8 millimoles) of 2-(4-methylmercaptophenyl)-1,3-di(4-pyridyl)-2-propanol in 50 ml. of sulfuric acid was first prepared, following which it was stirred for a period of about one hour at a temperature of about 75° C. At the end of that period of time, the reaction mixture was poured into an excess of iced ammonium hydroxide. The mixture was then extracted with 150 ml. of ether and dried over magnesium sulfate. The solvent was thereafter removed, in vacuo, to yield cis 2-(4-methylmercaptophenyl)-1,3-di(4-pyridyl)-1-propene in the form of an oil. Crystallization and recrystallization of this product from hexane yielded cis 2-(4-methylmercaptophenyl)-1,3-di(4-pyridyl)-1-propene, in the form of colorless prisms melting at 96° to 98° C.

The starting 2-(4-methylmercaptophenyl)-1,3-di(4-pyridyl)-2-propanol was prepared by reacting 4-picolyl lithium with p-methylmercaptobenzoyl chloride, the process being carried out in the same manner as described in Example 1 for the production of 2-phenyl-1,3-di(4-pyridyl)-2-propanol.

EXAMPLE 6

In this example, a solution of 5.0 grams (15.6 millimoles) of 2-(4-methoxyphenyl)-1,3-di(4-pyridyl)-2-propanol in 75 ml. of sulfuric acid (75%) was first prepared and stirred for a period of about one hour at a temperature of about 100° C. At the end of that period of time, the reaction mixture was poured in 500 grams of ice and 250 ml. of concentrated ammonium hydroxide. The mixture was extracted with ether and the extracts were dried over magnesium sulfate. Thereafter, the extracts were concentrated to yield a colorless oil. Crystallization of this oil from hexane, yielded 2-(4-methoxyphenyl)-1,3-di(4-pyridyl)-1-propene, melting at 57° to 60° C.

The 2-(4-methoxyphenyl)-1,3-di(4-pyridyl)-2-propanol starting material employed in this example, was prepared, in the same manner as is described in Example 1 for the production of 2-phenyl-1,3-di(4-pyridyl)-2-propanol, by the reaction of 4-picolyl lithium with p-methoxybenzoyl chloride.

EXAMPLE 7

A solution of 15.0 grams (71.5 millimoles) of 2-methyl-1,3-di(4-pyridyl)-1-propene, produced as described in Example 2, was dissolved in 300 ml. of ethyl acetate. To this solution there was added 1.0 gram of 10% palladium on carbon catalyst. The compound was, thereafter, hydrogenated at atmospheric pressure and room temperature. The reaction mixture absorbed the required amount of hydrogen, i.e. one molar equivalent in a period of about six hours. At the end of that period, the catalyst was separated from the reaction mixture by filtration, following which the filtrate was concentrated to an oil under reduced pressure. The residue was then dissolved in 200 ml. of anhydrous ether and saturated with hydrogen chloride. The precipitated oil crystallized upon the addition of a small amount of methanol. Recrystallization of the product from a methanol-ether mixture yielded 2-methyl-1,3-di(4-pyridyl) propane dihydrochloride as colorless prisms melting at 223° to 245° C.

EXAMPLE 8

In this example, a mixture of 10.0 grams (37 millimoles) of a 1:1 mixture of cis 1,3-di(4-pyridyl)-2-phenyl-1-propene and trans 1,3-di(4-pyridyl)-2-phenyl-1-propene, produced as described in Example 1, was dissolved in 250 ml. of ethyl acetate. To this solution there was added 1.0 gram of 10% palladium on charcoal. The product was thereafter hydrogenated at a temperature of about 25° C. at atmospheric pressure. Over a period of about 72 hours, one molar equivalent of hydrogen was absorbed. At the end of such period, the catalyst was removed by filtration, following which the filtrate was concentrated, in vacuo, to about 9.1 grams. A colorless oil was thus formed which crystallized slowly to 2-phenyl-1,3-di(4-pyridyl) propane, melting at 45° to 60° C. Recrystallization from ether-hexane yielded the product in the form of colorless prisms melting at 53° to 60° C.

EXAMPLE 9

In this example, a solution of 1.3 gram (4.54 millimoles) of cis 1,3-di(4-pyridyl)-2-(p-tolyl)-1-propene, produced as described in Example 3, in 200 ml. of ethyl acetate was first prepared. To this solution there was added mg. of 10% palladium on carbon as a catalyst. The product was then hydrogenated at room temperature and atmospheric pressure. Over a period of about four hours, one molar equivalent of hydrogen was absorbed. Thereafter, the catalyst was removed by filtration and the solvent was removed, under reduced pressure, to give 1.3 grams of oil. Recrystallization from hexane-ether yielded 1,3-di(4-pyridyl)-2-(p-tolyl) propane melting at 94° to 96° C.

EXAMPLE 10

In this example, a solution of 2.0 grams (6.9 millimoles) of a mixture of cis 2-(2-fluorophenyl)-1,3-di(4-pyridyl)-1-propene and trans 2-(2-fluorophenyl)-1,3-di(4-pyridyl)-1-propene in 250 ml. of ethyl acetate was first prepared. To this solution there was added 1.0 gram of 10% palladium on carbon catalyst. The product was, thereafter, hydrogenated at atmospheric pressure and room temperature, until one molar equivalent of hydrogen had been absorbed. The catalyst was then removed from the solution by filtration and the filtrate was concentrated to yield 2.0 grams of an oil. This oil was crystallized from hexane to yield 2-(2-fluorophenyl)-1,3-di(4-pyridyl) propane in the form of colorless prisms melting at 52° to 55° C.

The starting material used in this example, that is the mixture of the cis and trans 2-(2-fluorophenyl)-1,3-di(4-pyridyl)-1-propene was prepared as described in Example 4.

EXAMPLE 11

In this example, a solution of 10.0 grams (33 mmole) of 1,3-di(4-pyridyl)-2-(o-tolyl)-2-propanol in 75 ml. of 75 sulphuric acid was heated at a temperature of about 95° C. for a period of about two hours. This solution was cooled and, thereafter, it was poured over iced ammonium hydroxide and extracted with ether. The extract was dried and concentrated, in vacuo, to provide an oil-like residue. This residue was subsequently hydrogenated at room temperature and atmospheric pressure in ethyl acetate using a palladium-charcoal catalyst. When the hydrogenation was complete, the catalyst was removed by filtration, and the solvent was removed by heating in vacuo.

There was, thus obtained, 1,3-di(4-pyridyl)-2-(o-tolyl)-propane in the form of an oil which yielded crystals, melting point 100° C. to 103° C., on standing. Recrystallization of the product from hexane yielded colorless needles, melting point at 100° C. to 102° C.

While not within the scope of the present invention, the preparation of the starting 1,3-di-(4-pyridyl)-2-(o-tolyl)-2-propanol is given herein for completeness of disclosure. In the preparative method, 0.2 mole of o-toluic acid chloride dissolved in 150 ml. of tetrahydrofuran was added, in a dropwise fashion over a period of about sixty minutes, to a stirred solution of 0.5 mole of 4-picolyl lithium. The addition was carried out in an atmosphere of dry nitrogen, with the 4-picolyl lithium solution being cooled to −30° C. to −50° C. The reaction mixture was treated with 100 ml. of water within a three hour period, following which it was extracted three times, using 150 ml. of 6 N hydrochloric acid each time. The acid extract was washed three times, using 150 ml. of ether each time. The product was liberated by stirring into a mixture of 500 grams of ice and 300 ml. of concentrated ammonium hydroxide. Ice was added, as needed, to maintain the temperature at about 0° C.

The mixture was then filtered to yield an orange-colored solid. The solid was washed with a mixture of 200 ml. of methylene chloride and 400 ml. of water. The solid was then crystallized from acetone to yield 1,3-di(4-pyridyl)-2-(o-tolyl)-2-propanol, melting at 154° C. to 156° C.

EXAMPLE 12

In this example, 10.0 grams (33 mmole) of 1,3-di(4-pyridyl)-2-(m-tolyl)-2-propanol was added to 75 ml. of 75% sulphuric acid. The mixture was refluxed for a period of about two hours. Thereafter, the reaction mixture was poured into iced ammonium hydroxide and extracted three times, using 100 ml. portions of ether each time. The thus obtained mixture was subsequently dissolved in ethyl acetate and hydrogenated using a palladium-charcoal catalyst. The product was filtered and the solvent was removed therefrom, in vacuo, to obtain 1,3-di(4-pyridyl)-2-(m-tolyl)-propane in a form of colorless viscous oil. An analytical sample was obtained by distillation at 195° C./0.03 mm.

For the sake of complete disclosure, the method by which the starting 1,3-di(4-pyridyl)-2-(m-tolyl)-2-propanol is given herein although it is to be understood that neither the compound or its preparation method is part of the present invention. The compound is obtained, as described in the preceding example, by reacting 0.5 mole 4-picolyl lithium with 0.2 mole of m-toluic acid chloride. The reaction mixture was, at the completion of the reaction, filtered to yield a solid which was washed with water. This solid was treated with 200 ml. of methylene chloride and 400 ml. of water, following which the mixture was filtered. There was, thus obtained, 1,3-di(4-pyridyl)-2-(m-tolyl)-2-propanol, melting at 146° C. Recrystallization of the compound from acetone yielded colorless prisms melting at 150° C. to 151° C.

EXAMPLE 13

In this example, 7.85 grams of sodium cyanide were dissolved in 100 ml. of concentrated sulfuric acid at a temperature of 0° C. The solution was stirred for a period of about thirty minutes, following which it was cooled to a temperature of about minus 5° C. To this solution, 23.2 grams of 2-phenyl-1,3-di(4-pyridyl)-2-propanol were added, portionwise, over a period of about fifteen minutes. The mixture was then stirred at a temperature of about minus 5° C. for an additional fifteen minutes and then it was poured over 2 kg. of ice. The reaction mixture was then made strongly alkaline using ammonium hydroxide and the product was extracted into dichloromethane four times, using 200 ml. of dichloromethane each time. The organic extracts were combined, washed with water, dried, filtered and evaporated to yield an oil-like product. Crystallization and recrystallization of the oil from a dichloromethane-ether mixture yielded N-[1-phenyl-1,1-di(4-pyridylmethyl)methyl]formamide in the form of colorless rods, melting at a temperature of 214° C. to 216° C.

The 2-phenyl-1,3-di(4-pyridyl)-2-propanol which was used in this example as the starting material, was prepared as described in Example 1.

EXAMPLE 14

In this example, 2.6 grams of N-[1-phenyl-1,1-di(4-pyridylmethyl)methyl]formamide, prepared as described in Example 13, was dissolved in 50 ml. of 3 N hydrochloric acid and the solution was heated at reflux temperature for about 2.5 hours. Thereafter, it was poured over 50 grams of ice. The reaction mixture was made alkaline using dilute sodium hydroxide solution and, subsequently, the product was extracted into ether four times using 50 ml. of ether each time. The organic extracts were combined, washed with water, dried over anhydrous sodium sulfate, filtered and concentrated. The residue, which was thus obtained, was recrystallized from an ether-petroleum ether mixture to yield 2-phenyl-1,3-di(4-pyridyl)-2-propylamine in the form of white prisms melting at a temperature of 117° C. to 119° C.

EXAMPLE 15

In this example, 1.9 grams of 2-phenyl-1,3-di(4-pyridyl)-2-propylamine, produced as described in Example 14, were suspended in 20 ml. of N,N-dimethylformamide. This suspension was treated with 0.43 gram of a 50% dispersion of sodium hydride in mineral oil at a temperature of 5° C. Thereafter, 1.11 ml. of methyl iodide was added and the reaction mixture was stirred for a period of about fifteen hours at a temperature within the range of from about 0° C. to 10° C. At the end of that period of time, the reaction mixture was poured into 300 ml. of water. The product was extracted three times into dichloromethane, using 100 ml. of dichloromethane for each extraction. The dichloromethane extracts were combined, washed with water, dried over sodium sulfate, filtered and concentrated. The residue, which was thus obtained, was crystallized overnight from ethanol and the product was recrystallized from an ethanol-hexane mixture to yield N-methyl-N-[1-phenyl-1,1-di(4-pyridylmethyl)methyl]-formamide in the form of white prisms, melting at 212° C. to 213° C.

EXAMPLE 16

(a) In this example, 6.0 grams of N-methyl-N-[1-phenyl-1,1-di(4-pyridylmethyl)methyl]formamide, produced as described in Example 15, were dissolved in 25 ml. of 9 N hydrochloric acid. This solution was heated at reflux temperature for a period of about six hours, following which it was poured over 200 grams of ice. The solution was then made alkaline using ammonium hydroxide and the product was extracted three times into dichloromethane, using 100 ml. of dichloromethane for each extraction. The organic extracts were combined, washed with water, dried over sodium sulfate, filtered and evaporated to yield, after crystallization and recrystallization from an ether-petroleum ether mixture, 2-methylamino-2-phenyl-1,3-di-(4-pyridyl)propane in the form of white prisms melting at 120° C. to 123° C.

(b) The following is an alternate method for producing 2-methylamino-2-phenyl-1,3-di(4-pyridyl)propane. In this method, N-[1-phenyl-1,1-di(4-pyridylmethyl)methyl]formamide, produced as described in Example 13, was dissolved in 25 ml. of anhydrous tetrahydrofuran. The solution, thus obtained, was treated, portionwise, with 0.46 gram of lithium aluminum hydride. The mixture was then heated at reflux temperature for a period of about sixty minutes, following which it was treated with 25 ml. of a saturated solution of potassium bicarbonate. The solution was then filtered and the solid cake was washed with dichloromethane. The filtrates were combined and treated with 200 ml. of water, following which they were extracted three times, using 100 ml. of dichloromethane each time. The organic extracts were combined, washed with water, dried over anhydrous sodium sulfate and concentrated. The residue was dissolved in ether and the solution was saturated with dry hydrogen chloride gas. The salt, which was thus formed, was filtered, dissolved in water and decomposed with dilute sodium hydroxide. The product was then extracted into dichloromethane and the extracts were washed, dried, and evaporated. The residue, upon recrystallization from an ether-petroleum ether mixture, yielded 2-methylamino-2-phenyl-1,3-di(4-pyridyl)propane melting at 121° to 123° C.

EXAMPLE 17

In this example, 0.99 gram of 2-methylamino-2-phenyl-1,3-di(4-pyridyl) propane, produced as described in Example 16, was suspended in 50 ml. of anhydrous tetrahydrofuran. The suspension, thus obtained, was treated with 0.23 gram of lithium aluminum hydride. The reaction mixture was stirred at room temperature for a period of about sixty minutes, following which it was heated at reflux temperature for a period of about two hours. The reaction mixture was then treated with 1.5 ml. of 0.8 N sodium hydroxide solution. Thereafter, it was stirred for a period of about twenty minutes and filtered. The filtrate was diluted with 100 ml. of water and the product was extracted three times into dichloromethane, using 25 ml. of dichloromethane for each extraction. The organic extracts were combined, washed with water, dried, filtered and concentrated. The residue, thus obtained, was recrystallized from hexane to yield 2-dimethylamino-2-phenyl-1,3-di(4-pyridyl) propane melting at 196° C. to 197° C.

EXAMPLE 18

This example is included herein to demonstrate the preparation of dosage forms containing as the active ingredient a representative compound of this invention.

(a) Capsule formulation: 5 mg. of 2-phenyl-1,3-di(4-pyridyl)-propane were mixed with 170 mg. of lactose, U.S.P. and 30 mg. of corn starch, U.S.P. The mixture was then blended by passing through a Fitzpatrick Comminuting Machine with a No. 1A screen with knives forward. The blended powder was, thereafter, returned to the mixer and 5 mg. of talc was added thereto and blended therewith. The product was subsequently filled into hard shell gelatin capsules.

(b) Tablet formulation: 25.0 mg. of 2-phenyl-1,3-di(4-pyridyl)-propane were mixed with 64.5 mg. of lactose, U.S.P., 10.0 mg. of corn starch and 0.5 mg. of magnesium stearate. The mixture was blended by passing through a Fitzpatrick Comminuting Machine, fitted with a No. 1A screen with knives forward. The powder was then slugged on a tablet compressing machine, following which the slugs were comminuted using a No. 16 screen. The mixture was compressed at a tablet weight of 100 mg. using tablet punches having a diameter of approximately ¼ inch.

(c) Parenteral formulation: 1.0 mg. of 2-phenyl-1,3-di(4-pyridyl)-propane was slurried in a small amount of water. To the slurry there was added slowly 1 N hydrochloric acid to pH of 3.0. The solution was filtered and allowed to stand for twenty-four hours. Thereafter, the filtrate was filtered through a 02 Selas candle. The filtrate was then filled into ampules under an atmosphere of nitrogen, which were then sealed. The ampules are sterilized for twenty minutes at a temperature of 250° F.

EXAMPLE 19

This example is included herein to demonstrate the preparation of dosage forms containing as the active ingredient another representative compound of this invention.

(a) Capsule formulation: 25 mg. of cis-1,3-di(4-pyridyl)-2-phenyl-1-propene were mixed with 150 mg. of lactose, U.S.P. and 30 mg. of corn starch, U.S.P. The mixture was then blended by passing through a Fitzpatrick Comminuting Machine with a No. 1A screen with knives forward. The blended powder was, thereafter, returned to the mixer and 5 mg. of talc was added thereto and blended therewith. The product was subsequently filled into hard shell gelatin capsules.

(b) Tablet formulation: 10.20 mg. of cis-1,3-di(4-pyridyl)-2-phenyl-1-propene were mixed with 79.30 mg. of lactose, U.S.P., 10.0 mg. of corn starch and 0.5 mg. of magnesium stearate. The mixture was blended by passing through a Fitzpatrick Comminuting Machine, fitted with a No. 1A screen with knives forward. The powder was then slugged on a tablet compressing machine, following which the slugs were comminuted using a No. 16 screen. The mixture was compressed at a tablet weight of 100 mg. using tablet punches having a diameter of approximately ¼ inch.

(c) Parenteral formulation: 1.0 mg. of cis-1,3-di(4-pyridyl)-2-phenyl-1-propene was slurried in a small amount of water. To the slurry there was added slowly 1 N hydrochloric acid to pH of 3.0. The solution was filtered and allowed to stand for twenty-four hours. Thereafter, the filtrate was filtered through a 02 Selas candle. The filtrate was then filled into ampules under an atmosphere of nitrogen, which were then sealed. The ampules were sterilized for twenty minutes at a temperature of 250° F.

I claim:

1. A compound selected from the group consisting of a member having the formula

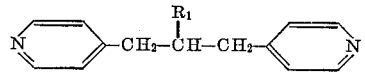

in which $R_1$ is a member selected from the group consisting of an alkyl group having from 3 to 7 carbon atoms, a cyclo-alkyl group having from 3 to 8 carbon atoms, phenyl, phenyl substituted by lower alkyl, halogen, lower alkoxy or lower alkylmercapto, benzyl, pyridyl, furyl, thienyl, pyrrolyl or lower alkyl substituted pyridyl, furyl, thienyl or pyrrolyl and salts thereof with medicinally acceptable acids.

2. 2-phenyl-1,3-di(4-pyridyl)-propane.
3. 1,3-di(4--pyridyl)-2-(p-tolyl)-propane.
4. 2-(2-fluorophenyl)-1,3-di(4-pyridyl)-propane.
5. 1,3-di(4-pyridyl)-2-(o-tolyl)propane.
6. 1,3-di(4-pyridyl)-2-(m-totyl(propane.

References Cited

UNITED STATES PATENTS

| 2,624,738 | 1/1953 | Goldberg et al. | 260—293 |
| 2,947,756 | 8/1960 | Huebner | 260—296 |
| 3,268,541 | 8/1966 | Gurien et al. | 260—296 |

OTHER REFERENCES

Jampolsky et al.: J. Am. Chem. Soc., vol. 74, pp. 5222 to 5224 (1952).

Heer et al.: Helv. Chim. Acta, vol. 34, pp. 134 to 135 (1955).

JOHN D. RANDOLPH, *Primary Examiner.*

U.S. Cl. X.R.

260—240, 294.8, 295; 424—263

UNITED STATES PATENT OFFICE
CERTIFICATE OF CORRECTION

Patent No. 3,420,841                                        January 7, 1969

Bernard Brust et al.

It is certified that error appears in the above identified patent and that said Letters Patent are hereby corrected as shown below:

Column 11, line 47, "mg." should read -- 250 mg. --. Column 16, line 23, "2-(m-totyl(" should read -- 2-(m-tolyl) --.

Signed and sealed this 24th day of March 1970.

(SEAL)
Attest:

Edward M. Fletcher, Jr.
Attesting Officer

WILLIAM E. SCHUYLER, JR.
                                                    Commissioner of Patents